United States Patent
Harada et al.

(10) Patent No.: US 7,944,850 B2
(45) Date of Patent: May 17, 2011

(54) BASE STATION, USER EQUIPMENT, AND METHOD

(75) Inventors: Atsushi Harada, Kawasaki (JP); Minami Ishii, Yokohama (JP); Sadayuki Abeta, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 49 days.

(21) Appl. No.: 12/305,915

(22) PCT Filed: Jun. 19, 2007

(86) PCT No.: PCT/JP2007/062352
§ 371 (c)(1),
(2), (4) Date: Apr. 10, 2009

(87) PCT Pub. No.: WO2007/148705
PCT Pub. Date: Dec. 27, 2007

(65) Prior Publication Data
US 2010/0165854 A1    Jul. 1, 2010

(30) Foreign Application Priority Data
Jun. 19, 2006    (JP) .............................. P2006-169442

(51) Int. Cl.
*G01R 31/08* (2006.01)
(52) U.S. Cl. .......................... 370/252; 370/230; 370/468
(58) Field of Classification Search .......... 370/347–348, 370/442–444, 278, 331–333, 338
See application file for complete search history.

(56) References Cited

U.S. PATENT DOCUMENTS

| | | | |
|---|---|---|---|
| 2003/0002472 A1* | 1/2003 | Choi et al. ..................... | 370/347 |
| 2005/0207374 A1* | 9/2005 | Petrovic et al. ............... | 370/331 |
| 2007/0183451 A1* | 8/2007 | Lohr et al. ..................... | 370/473 |
| 2008/0159184 A1* | 7/2008 | Niwano ........................ | 370/278 |

FOREIGN PATENT DOCUMENTS

| | | |
|---|---|---|
| JP | 2001-339458 A | 12/2001 |
| JP | 2003-534745 A | 11/2003 |
| JP | 2005-244991 A | 9/2005 |
| WO | 01/91497 A1 | 11/2001 |
| WO | 2004/073245 A1 | 8/2004 |

OTHER PUBLICATIONS

International Search Report w/translation from PCT/JP2007/062352 dated Sep. 18, 2007 (4 pages).

(Continued)

*Primary Examiner* — Ricky Ngo
*Assistant Examiner* — Iqbal Zaidi
(74) *Attorney, Agent, or Firm* — Osha • Liang LLP

(57) ABSTRACT

A base station performing a radio communication with a user equipment includes a transmission format determining unit configured to determine a transmission format of a downlink data channel not to be associated by a control channel, based on a downlink reception signal quality measured by the user equipment, a notification unit configured to notify, to the user equipment, the transmission format determined by the transmission format determining unit, and a transmitting unit configured to transmit downlink data to the user equipment via the downlink data channel, by using the transmission format determined by the transmission format determining unit.

8 Claims, 8 Drawing Sheets

OTHER PUBLICATIONS

Written Opinion from PCT/JP2007/062352 dated Sep. 18, 2007 (3 pages).

Patent Abstracts of Japan; Publication No. 2005-244991 dated Sep. 8, 2005; Samsung Electronics Co. Ltd. (1 page).

Patent Abstracts of Japan; Publication No. 2001-339458 dated Dec. 7, 2001; Matsushita Electric Ind. Co. Ltd. (1 page).

3GPP TSG-RAN WG2 meeting #51; R2-060550; "Further details on HS-SCCH-less operation for VoIP traffic"; Denver, Colorado, Feb. 13-17, 2006; pp. 1-7 (7 pages).

3GPP TSG-RAN WG1 #43; R1-05-1511; "HS-SCCH-less HS-PDSCH operation for improved support if IMS real-time services"; Seoul, Korea, Nov. 7-11, 2005; pp. 1-7 (7 pages).

\* cited by examiner

FIG. 8
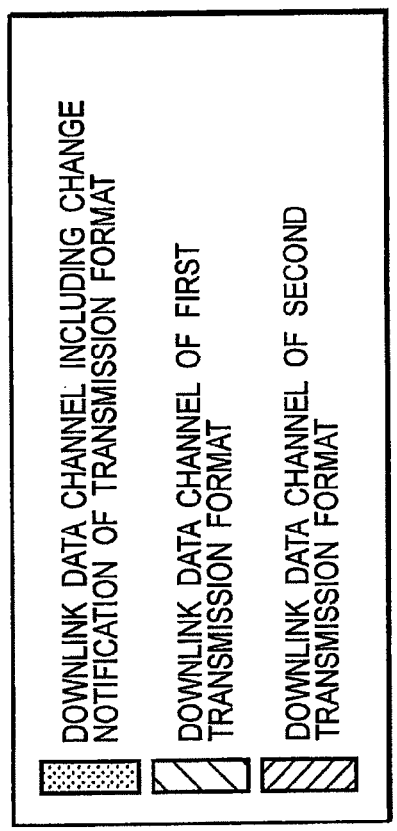
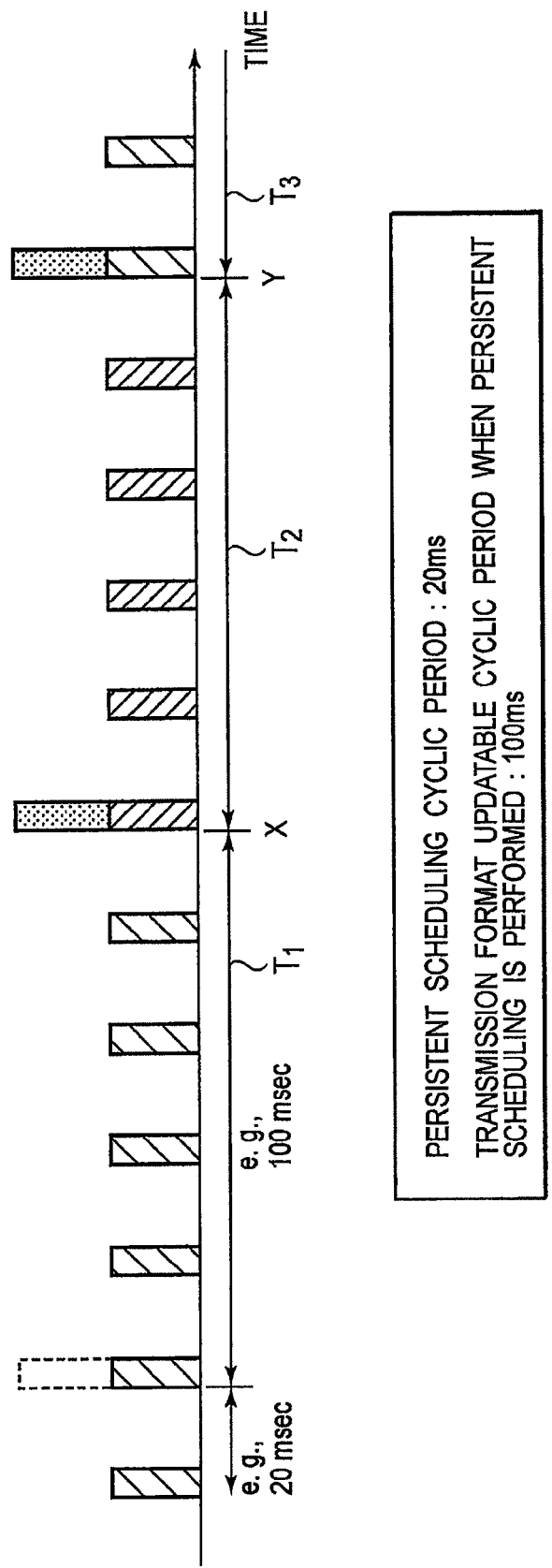

BASE STATION, USER EQUIPMENT, AND METHOD

TECHNICAL FIELD

The present invention relates to a base station, a user equipment, and a method, which are used in a mobile communication system.

BACKGROUND ART

In an existing mobile communication system, such as high-speed downlink packet access (HSDPA: High Speed Downlink Packet Access), an adaptive modulation and a channel coding (AMC: Adaptive Modulation and Channel coding) are performed in order to improve a data throughput (particularly, a data throughput in a downlink).

In the AMC, the modulation method and the channel coding ratio are appropriately changed (in every TTI (Transmission Time Interval) of about 0.5 ms in an extreme example) depending on the quality of a channel condition. Accordingly, the data can be transmitted by a larger amount and at a higher speed.

In particular, the AMC can greatly improve the throughput when data having a long packet length is transmitted.

In the AMC, it is required to notify, to a user equipment, an appropriate modulation method and a channel coding ratio for a downlink data channel (shared data channel), in each downlink data transmissions. Such notification is performed by utilizing a downlink control channel that is referred to as an L1/L2 control channel (L1/L2 signaling channel).

The L1/L2 control channel includes information essential for decoding the downlink data on the downlink data channel (may include not only information relating to the AMC, but also information relating to a frequency resource block used for the downlink data transmission or the like). For this reason, the L1/L2 control channel has to be transmitted along with the downlink data channel, for every downlink data channel transmission.

Accordingly, when downlink data having a short packet length is frequently transmitted, a ratio of a radio resource assigned to the L1/L2 control channel (downlink control channel) is increased while a radio resource assigned to the downlink data channel is decreased. This is because the L1/L2 control channel has to be transmitted while being associated by all the downlink data channels each transmitting the downlink data.

Here, representative examples of data generated frequently and having a short packet length include a voice packet, a packet for VoIP, and real time data.

In order to cope with such an inconvenience, a technique referred to as "Persistent Scheduling" has been proposed.

In this technique, downlink data (typically, a voice packet) is transmitted via a downlink data channel by one fixed transmission format in a predetermined cyclic period, for example, 20 ms.

Such transmission format includes information necessary for decoding the downlink data on the downlink data channel, such as the modulation method and the channel coding ratio.

For example, such technique is configured so that the modulation method is fixedly set to "QPSK," that the channel coding ratio is fixedly set to "⅓," and that the transmission format including the modulation method and the channel coding ratio is known to a base station and a user equipment.

Accordingly, the user equipment can properly receive the downlink data on the downlink data channel without receiving the downlink control channel such as the L1/L2 control channel.

It is also proposed that two types of transmission formats are prepared as the aforementioned transmission format. In this case, the L1/L2 control channel is not used either.

In this case, the user equipment tries to decode the downlink data on the downlink data channel by using both of the two types of the transmission formats. Then, the downlink data having been successfully decoded will be used in further processing in a subsequent stage. Such a technique is also referred to as "Blind Detection."

In any case, the persistent scheduling deals with the above-mentioned problem by decreasing options of the transmission format of the downlink data channel that transmits the downlink data such as a voice packet, thereby omitting the L1/L2 control channel.

Note that, such persistent scheduling is described in, for example, non-patent document 1 and non-patent document 2.

However, in the above-described technique, the number of options of the transmission format of the downlink data channel is considerably limited (is limited to approximately the number making the blind detection executable). Accordingly, the above-described technique has a disadvantage from the viewpoint of improving the downlink data transmission efficiency in consideration of the channel condition.

Non-Patent Document 1

R1-051511, 7-11 Nov., 2005, 3GPP TSG-RAN WG1 #43, Qualcomm Europe, page 2, Section 3

Non-Patent Document 2

R2.060550, 13-17 Feb., 2006, 3GPP TSG-RAN WG2 #51, Qualcomm Europe, page 1, Section 2

DISCLOSURE OF THE INVENTION

In this regard, the present invention has been made in view of the foregoing problems. An object of the present invention is to provide a base station, a user equipment, and a method, in which a downlink data transmission efficiency can be improved in a mobile communication system configured to transmit downlink data to the user equipment by a predetermined cyclic period by using an existing transmission format.

A first aspect of the present invention is summarized as a base station performing a radio communication with a user equipment, including: a transmission format determining unit configured to determine a transmission format of a downlink data channel not to be associated by a control channel, based on a downlink reception signal quality measured by the user equipment; a notification unit configured to notify, to the user equipment, the transmission format determined by the transmission format determining unit; and a transmitting unit configured to transmit downlink data to the user equipment via the downlink data channel, by using the transmission format determined by the transmission format determining unit.

In the first aspect of the present invention, the notification unit may be configured to notify, to the user equipment, the transmission format determined by the transmission format determining unit, by using the downlink data channel.

In the first aspect of the present invention, the notification unit may be configured to notify, to the user equipment, the transmission format determined by the transmission format determining unit, by using an RRC signaling message.

In the first aspect of the present invention, the notification unit may be configured to notify, to the user equipment, the transmission format determined by the transmission format determining unit, by using an MAC control protocol data unit.

In the first aspect of the present invention, the transmitting unit may be configured to transmit downlink data via the downlink data channel, in a first cyclic period, and the notification unit may be configured to notify, to the user equipment, the transmission format determined by the transmission format determining unit, by using the control channel, in a second cyclic period that is longer than the first cyclic period.

In the first aspect of the present invention, the notification unit may be configured to notify, to the user equipment, information indicating a difference between a current transmission format of the downlink data channel and the transmission format determined by the transmission format determining unit, as the transmission format determined by the transmission format determining unit.

In the first aspect of the present invention, the transmitter unit may be configured to change the transmission format of the downlink data channel to the transmission format determined by the transmission format determining unit after an acknowledged response signal for the transmission format determined by the transmission format determining unit and notified to the user equipment is received from the user equipment.

In the first aspect of the present invention, the transmitter unit may be configured to change the transmission format of the downlink data channel back to the transmission format before a change, after a negative acknowledged response signal for the notified transmission format determined by the transmission format determining unit is received from the user equipment a predetermined number of times.

A second aspect of the present invention is summarized as a method used in a base station performing a radio communication with a user equipment, including: determining a transmission format of a downlink data channel not to be associated by a control channel, based on a downlink reception signal quality measured by the user equipment; notifying, to the user equipment, the transmission format determined by the transmission format determining unit; and transmitting downlink data to the user equipment via the downlink data channel, by using the transmission format determined by the transmission format determining unit.

A third aspect of the present invention is summarized as a user equipment performing a radio communication with a base station, including: a measurement unit configured to measure a downlink reception quality; a determining unit configured to determine whether or not to change a transmission format of a downlink data channel, based on the downlink reception signal quality measured by the measurement unit; a notification unit configured to notify, to the base station, a change request of the transmission format; an extracting unit configured to extract information of the transmission format notified by the base station; and a receiving unit configured to receive downlink data transmitted via a subsequent downlink data channel by using the transmission format extracted by the extracting unit.

A fourth aspect of the present invention is summarized as a method used in a user equipment that performs a radio communication with a base station, including: measuring a downlink reception quality; determining whether or not to change a transmission format of a downlink data channel, based on the downlink reception signal quality that is measured; notifying, to the base station, a change request of the transmission format; extracting information of the transmission format notified by the base station; and receiving downlink data transmitted via a subsequent downlink data channel by using the transmission format that is extracted.

BRIEF DESCRIPTION OF THE DRAWINGS

FIG. 8 is shows a timing chart before and after the change of a transmission format of a downlink data channel.

BEST MODES FOR CARRYING OUT THE INVENTION

Figure 1:
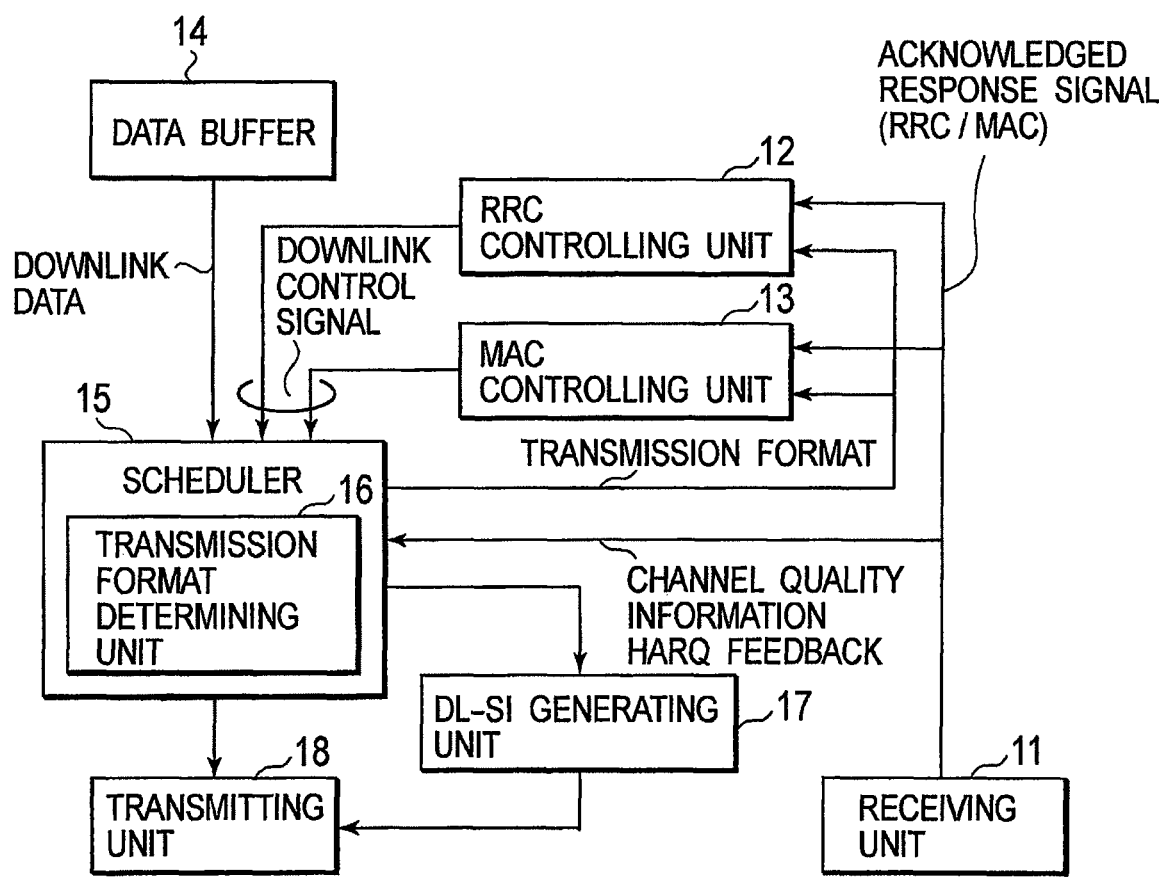
FIG. 1 shows a functional block diagram of a base station according to one embodiment of the present invention.

According to one embodiment of the present invention, for example, when downlink data to be periodically transmitted every 20 ms is transmitted via a downlink data channel by using a transmission format known to a user equipment, the transmission format can be adaptively changed less frequently than the frequency in which the downlink data is generated (for example, in a cycle equal to or longer than 100 ms).

Then, the transmission format is kept constant, in a period that is longer than the TTI (unit transmission time interval) such as 0.5 ms, and shorter than the talk time (for example, 100 ms).

Accordingly, in such a period, even when a channel (for example, L1/L2 control channel or the like) for notifying a content of the transmission format of the downlink data channel is not transmitted in each downlink data transmissions, the user equipment can properly restore the downlink data that is periodically transmitted via the downlink data channel by using the constantly-kept transmission format.

When the channel condition is changed in such a period of 100 ms, the transmission format of the downlink data channel used in a subsequent period is changed.

The changed content of the transmission format is notified from a base station to the user equipment via a downlink data channel or downlink control channel (such as L1/L2 control channel) that is periodically transmitted.

Accordingly, the transmission format may be changed to any proper transmission format. In other words, when downlink data to be periodically transmitted is transmitted via the downlink data channel by using a transmission format known to the user equipment (when persistent scheduling is performed), types of usable transmission formats do not need to be limited to a small number, but any number may be prepared.

The transmission format options may be prepared as many as the levels of MCS (Modulation and Coding Scheme) that is prepared for coping with instantaneous fading.

Thereby, when performing the persistent scheduling, proper link adaptation can be achieved and data transmission efficiency can be greatly improved.

From a viewpoint of reducing an information amount (overhead) required for the above-described change notification, in the persistent scheduling reducing the overhead, information showing a difference between a transmission format known to the user equipment and a newly-determined transmission format may be notified to the user equipment.

From a viewpoint of improving a reliability relating to the transmission format change, the transmission format of the downlink data channel may be changed to the determined transmission format after an acknowledged response signal for the change is received in the base station. Here, the acknowledged response signal is transmitted from the user equipment It may also be configured such that the transmission format of the transmission data channel may be changed back to the transmission format before the change, when a negative acknowledged response signal for the downlink data on the downlink data channel, which is transmitted by using the changed transmission format, is received in the base station a predetermined number of times. Here, the negative acknowledged response signal is transmitted from the user equipment.

It may be configured such that the change notification for the transmission format is transmitted by "RRC (Radio Resource Control) signaling message" or "MAC (Media Access Control) control protocol data unit (MAC-ctrl-PDU)".

In other words, the above-described change notification may be transmitted via the downlink data channel, by using the transmission format known to the user equipment, in a first cyclic period.

Alternatively, the above-described change notification may be transmitted via the downlink control channel, in a second cyclic period that is longer than the first cyclic period.

In the latter case, the above-described change notification is transmitted in the second cyclic period; thereby switching timing of the transmission format can be fixed in advance. Accordingly, the overhead required for the change notification can be reduced.

First Embodiment

FIG. 1 is a functional block diagram of a base station (eNodeB) according to the first embodiment of the present invention. FIG. 1 conceptually depicts an entity which particularly relates to the present invention.

Figure 2:
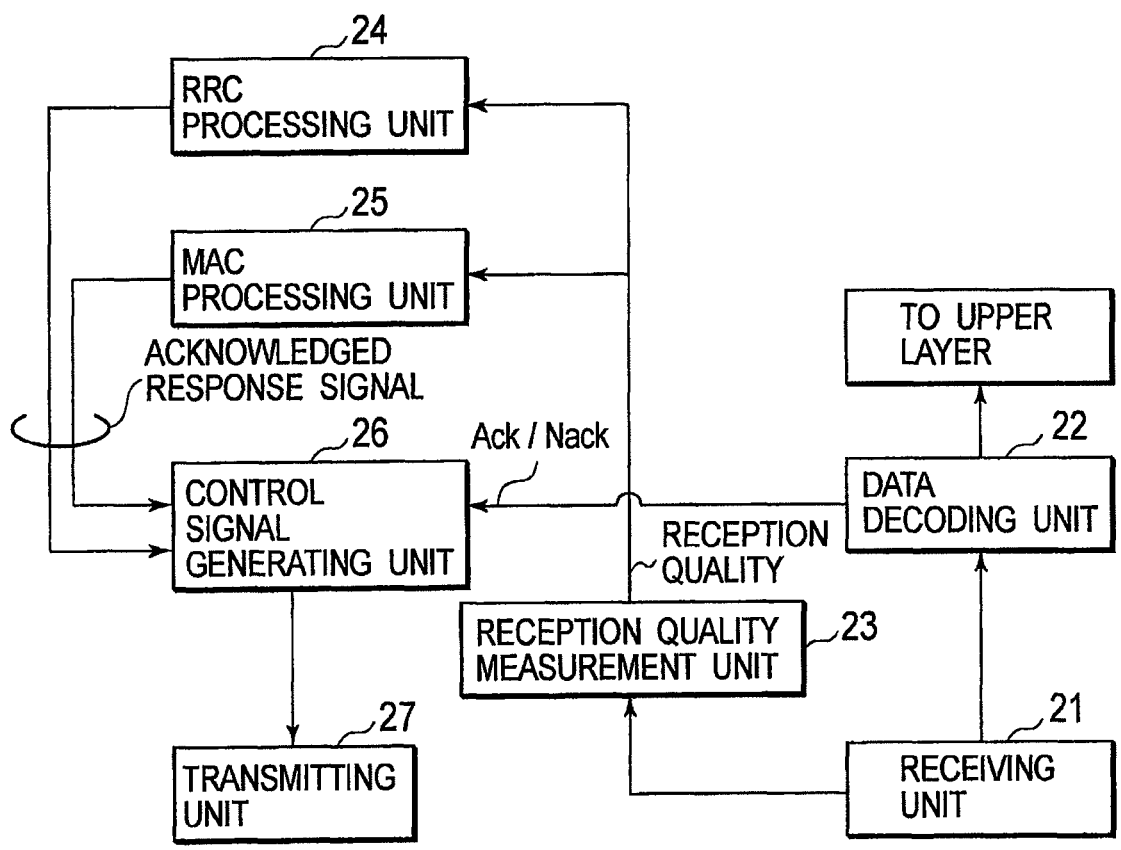
FIG. 2 shows a functional block diagram of a user equipment according to one embodiment of the present invention.

The base station is configured to perform a radio communication with a user equipment as shown in FIG. 2, and to perform a communication with an upper apparatus (not shown).

As shown in FIG. 1, the base station includes a receiving unit 11, an RRC controlling unit (radio resource controlling unit) 12, an MAC controlling unit (media access controlling unit) 13, a data buffer 14, a scheduler 15, a transmission format determining unit 16, a downlink scheduling (DL-SI) information generating unit 17, and a transmitting unit 18.

The receiving unit 11 is configured to receive a signal from the user equipment as shown in FIG. 2.

The RRC controlling unit 12 is configured to control a processing in a RRC sub-layer, for example, to perform a management of a radio resource, setting of a radio bearer, or the like.

In particular, in the present invention, the RRC controlling unit 12 is configured to generate a RRC signaling message showing a content or changed content of a transmission format of the downlink data channel.

The MAC controlling unit 13 is configured to control a processing in a MAC sub-layer, for example, to control a parameter relating to a scheduling of the data transmission.

In particular, in the present invention, the MAC controlling unit 13 is configured to generate an MAC control message (MAC control protocol data unit) showing content or changed content of the transmission format of the downlink data channel.

The data buffer 14 is configured to store traffic information to be transmitted to the user equipment. The traffic information may include data having a short packet length such as a voice packet, in addition to data having a long packet length. The traffic information may also include real time data or non-real time data.

The scheduler 15 is configured to perform a scheduling of the downlink data channel, based on the control messages and channel quality information. Here, the control messages are received from the RRC controlling unit 12 and the MAC controlling unit 13, and the channel quality information is received from the user equipment.

The transmission format determining unit 16 is configured to determine the transmission format, such as the modulation method or the channel coding ratio, which is applied to the downlink data channel.

The scheduler 15 is configured to make the determination on other matters such as the transmission timing or a frequency resource block. The DL-SI information generating unit 17 is configured to generate a downlink control channel (L1/L2 control channel) for transmitting the information showing the scheduled content.

The transmitting unit 18 is configured to transmit the downlink data channel and the downlink control channel according to the scheduled content.

The downlink control channel from the DL-SI information generating unit 17 is not used in the first embodiment and will be used in a third embodiment to be described later.

As shown in FIG. 2, the user equipment includes a receiving unit 21, a data decoding unit 22, a reception quality measurement unit 23, an RRC processing unit 24, an MAC processing unit 25, a control signal generating unit 26, and a transmitting unit 27.

The receiving unit 21 is configured to receive a signal transmitted from the base station.

The data decoding unit 22 is configured to decode the downlink data on the downlink data channel or a downlink control signal on the downlink control channel, which are received by the receiving unit.

The reception quality measurement unit 23 is configured to measure a reception quality of a predetermined signal (typically, a pilot signal on a pilot channel) received by the receiving unit.

The reception quality may be expressed in any proper amount. For example, the reception quality may be expressed by a measured value, such as an SIR (Signal to Interference plus Noise Ratio), or may be expressed by a CQI (Channel Quality Indicator) in which the measured value is coded.

The RRC processing unit 24 is configured to perform a processing corresponding to the RRC controlling unit 12 shown in FIG. 1. In other words, the RRC processing unit 24 is configured to perform the processing relating to the RRC sub-layer.

In the present invention, the RRC processing unit 24 is configured to extract information relating to the transmission format change of the downlink data channel, from the received RRC signaling message.

The MAC processing unit 25 is configured to perform a processing corresponding to the MAC controlling unit 13 shown in FIG. 1. In other words, the MAC processing unit 25 is configured to perform a processing relating to the MAC sub-layer.

In the present invention, the MAC processing unit 25 is configured to extract information relating to the transmission format change of the downlink data channel, from the received MAC control message.

The control signal generating unit 26 is configured to generate an uplink control signal to be transmitted to the base station via an uplink control channel.

The transmitting unit 27 is configured to transmit, via the uplink control channel, the uplink control signal generated by the control signal generating unit 26.

Note that, an element for transmitting uplink data via the uplink data channel is not shown in FIG. 2.

Figure 3:
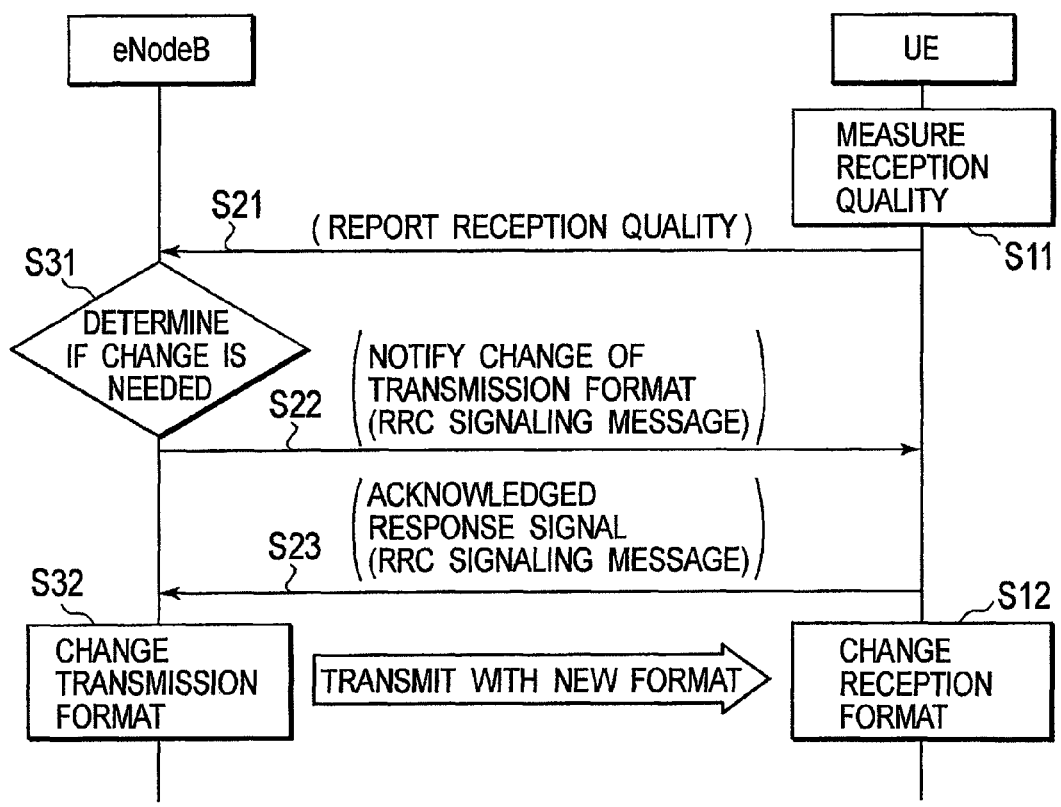
FIG. 3 is a flowchart showing an operational example of a mobile communication system according to a first embodiment of the present invention.

FIG. 3 is a flowchart showing an operational example of the mobile communication system according to the first embodiment of the present invention.

As shown in FIG. 3, in step S11, the user equipment (UE) receives, from the base station (eNodeB), a pilot signal on a downlink pilot channel, and measures a downlink reception quality by using the pilot signal.

In step S21, the user equipment reports the measured downlink reception quality to the base station.

Here, the reception quality is generally reported for each frequency resource blocks prepared in the mobile communication system. However, the reception quality in which a plurality of frequency resource blocks is averaged may be representatively reported.

In step S31, the base station determines whether or not the transmission format to be used for the downlink data channel is changed, based on the downlink reception quality received from the user equipment.

In the present embodiment, the downlink data channel is transmitted by a predetermined cyclic period (first cyclic period) such as, for example, 20 ms. This transmission format is known to the base station and the user equipment.

Accordingly, the downlink control channel (L1/L2 control channel) is not associated by each of the downlink data channels that transmits the downlink data every 20 ms. Each of the data channels uses the same transmission format.

In other words, in step S31, it is determined if the transmission format should be subsequently maintained or changed.

Here, whether or not the transmission format has to be changed may be determined based on the reported downlink reception quality, or/and a correspondence relationship between the downlink reception quality and an MCS level.

The MCS level is configured so as to be specified by a number (MCS number) showing the combination of the modulation method and the channel coding ratio. In general, the MCS level is configured so that a bit rate becomes larger as the number becomes larger, and that a bit rate becomes smaller as the number becomes smaller.

However, in the present invention, not only such a correspondence relationship, any proper correspondence relationship may be used as the correspondence relationship between the downlink reception quality and the MCS level.

In addition, the number of the MCS levels to be prepared may be any number (may be prepared in a large number). In this regard, the present invention significantly differs from the conventional persistent scheduling in which the number of options of the MCS level is considerably limited.

In step S22, when it is determined that the transmission format of the downlink data channel is to be changed, the base station notifies, to the user equipment, the changed content of the transmission format.

Figure 4:
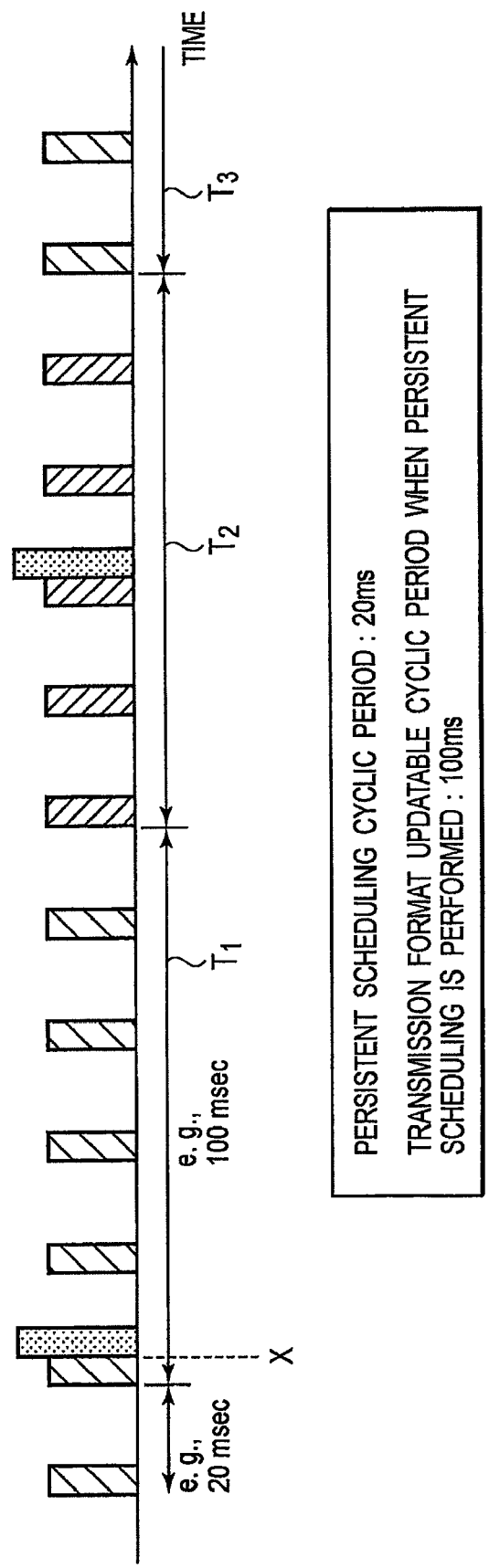
FIG. 4 shows a timing chart before and after the change of a transmission format of a downlink data channel.

In the example of FIG. 4, the base station notifies, to the user equipment, the changed content, by using an RRC signaling message. In other words, the base station transmits the RRC signaling message that includes the information (change notification) showing the changed content, via the downlink data channel, by using the transmission format known to the user equipment.

Figure 5:
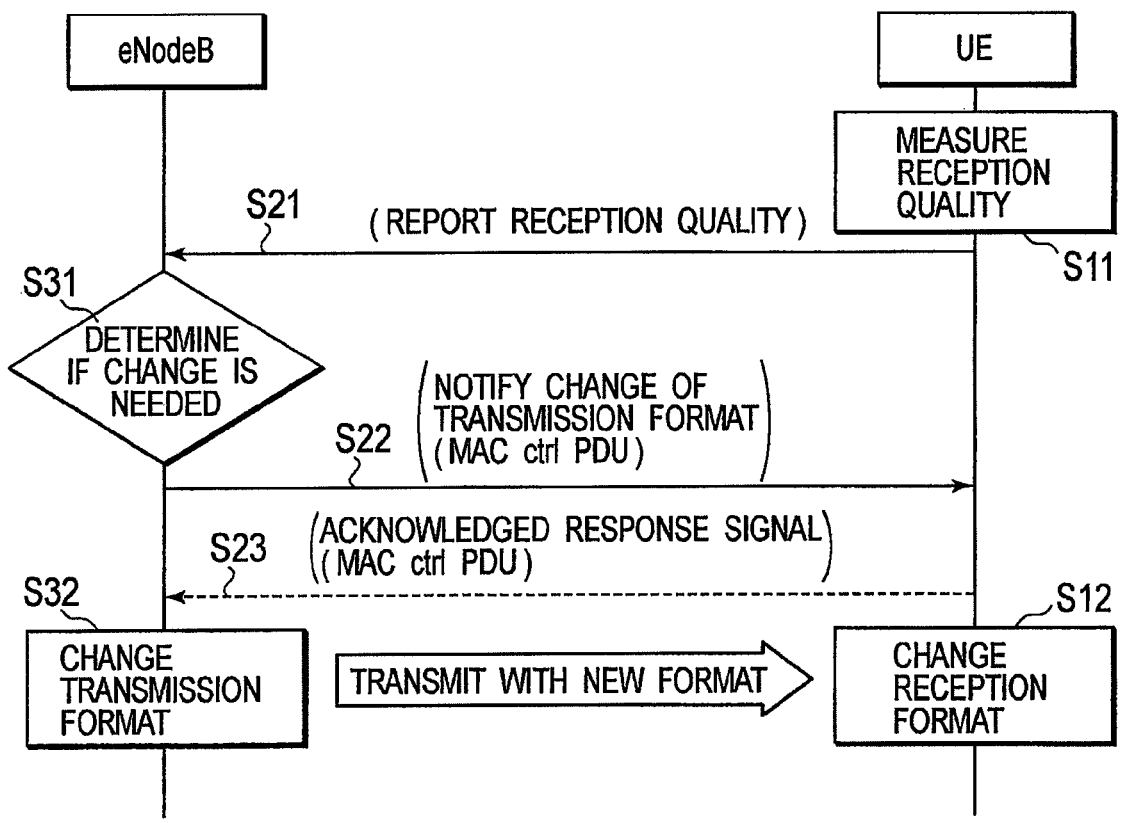
FIG. 5 is a flowchart showing an operational example of the mobile communication system according to the first embodiment of the present invention.

Note that, the change notification may be configured to be transmitted by using the RRC signaling message as described above. Alternatively, as shown in FIG. 5, the change notification may be configured to be transmitted by using an MAC control protocol data unit (MAC-ctrl-PDU) (this has been mentioned in the foregoing description as the MAC control message).

In step S23, the user equipment that has properly received the above-described change notification reports, to the base station, an acknowledged response signal for notifying that the change notification is properly received. The acknowledged response signal may be transmitted via any uplink control channel.

Such acknowledged response signal is not essential. However, from a viewpoint of improving a reliability relating to the transmission format change, it is preferable that some kind of acknowledged response signal be notified from the user equipment to the base station.

In the example of FIG. 3, the acknowledged response signal is transmitted as the RRC signaling message. As shown in FIG. 5, the acknowledged response signal may be transmitted by the MAC-ctrl-PDU.

In step S32, the base station changes the transmission format of the downlink data channel to the new transmission format determined in step S31. Then, the base station transmits the downlink data via the downlink data channel, by using the changed transmission format, by a predetermined cyclic period to be described later (for example, every 20 ms).

In step S12, the user equipment receives the downlink data transmitted via the downlink data channel by using the changed transmission format, by the predetermined cyclic period.

FIG. 4 shows an example of a timing chart before and after the transmission format change. The example of FIG. 4 shows a signal transmitted from the base station (it may be mentioned as a signal received by the mobile station).

In general, the downlink data is periodically transmitted via the downlink data channel in every 20 ms. In an example of FIG. 4, a same transmission format is used over a period of at least 100 ms.

In the first period $T_1$, a first transmission format is used for all of the downlink data channels that transmit the downlink data.

In the second period $T_2$, a second transmission format different from the first transmission format is used for all of the downlink data channels that transmit the downlink data.

In the example of FIG. 4, the change notification for notifying that the following format is to be changed is transmitted at time point X in the first period $T_1$. The change notification indicates that the transmission format of the downlink data has to be changed from the first transmission format to the second transmission format. In response to this change notification, the transmission format used in the second period $T_2$ is changed.

Note that, the time point of transmitting the downlink data channel not including the change notification and the time point of transmitting the downlink data channel including the change notification are depicted as being different from each other for simplifying the illustration. However, this is not essential for the present invention.

The above-described change notification may be transmitted at any given time point coming in a predetermined cyclic period (every 20 ms), or the change notification may be transmitted at a time point other than the predetermined cyclic period. However, the downlink data channel transmitting the change notification at any time point independent of the predetermined cyclic period is the normal downlink data channel that is associated by the L1/L2 control channel each designating the transmission format.

In the example of FIG. 4, in response to the change notification transmitted during the first period $T_1$, the transmission format to be used in the second period $T_2$ is changed. However, the transmission format may be changed later than that period.

The change notification may also include the information showing the time when the transmission formation is to be changed.

Alternatively, as shown in FIG. 3 and FIG. 5, the transmission format may be actually changed by the base station after the acknowledged response signal is obtained from the user equipment. In this case, in a period when the acknowledged response signal is not obtained, the first transmission format is still continuously used. In the example of FIG. 4, in response to the change notification transmitted during the second period $T_2$, the transmission format to be used in the successive third period $T_3$ is changed to the first transmission format.

In the above-described example, both determinations (A) and (B): (A) whether or not to change the transmission format, and (B) to which format the transmission format should be changed; are performed by the base station. However, it may be configured such that the user equipment may perform the determination (A) and the base station may perform only the determination (B).

Second Embodiment

Figure 6:
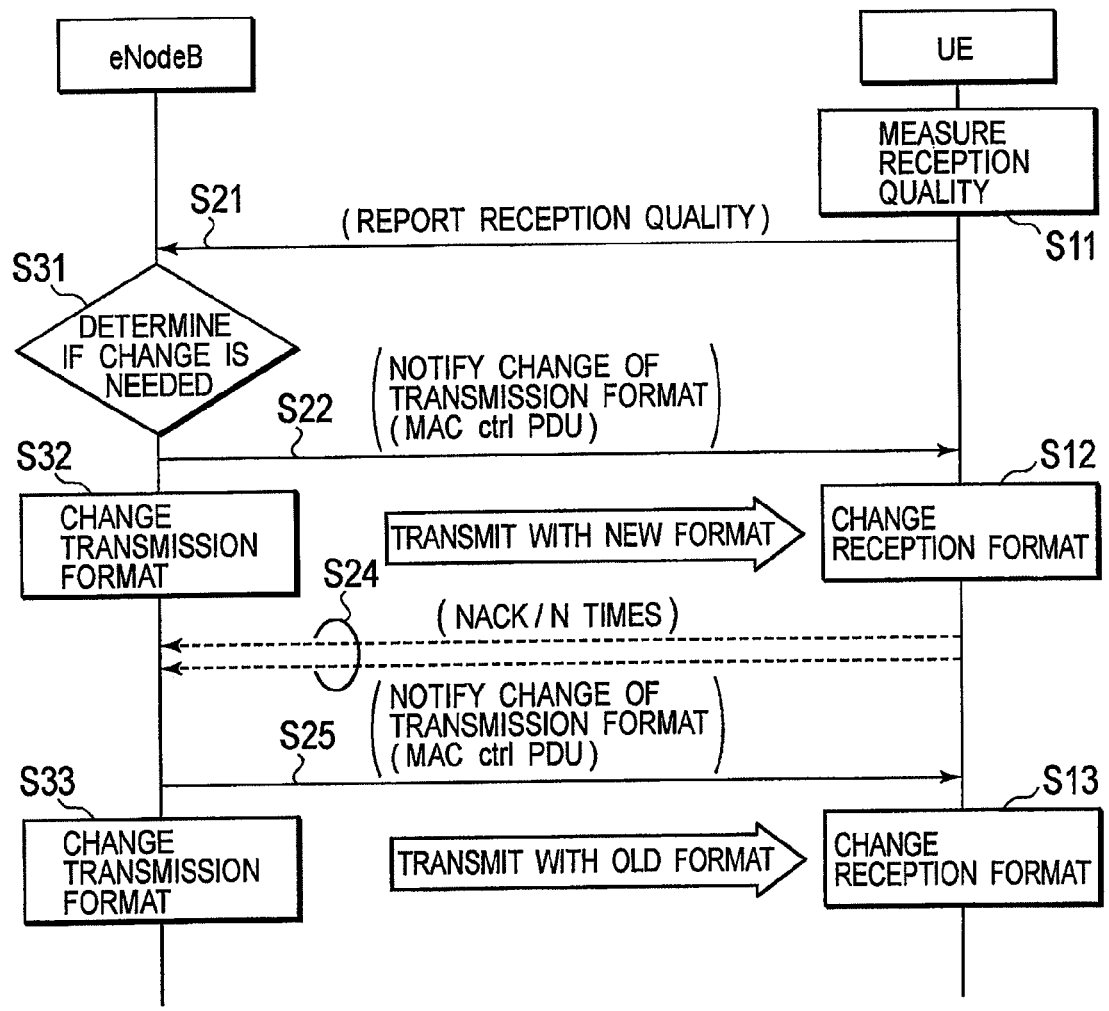
FIG. 6 is a flowchart according to an operational example of a mobile communication system according to a second embodiment of the present invention.

FIG. 6 is a flowchart showing an operational example of a mobile communication system according to a second embodiment of the present invention. Steps (S11, S21, S31, S22, S32, and S12) after a reception quality is measured in a user equipment until the communication is performed by using a new format are similar to those described in FIG. 3, and duplicated description will be omitted. However, in the present embodiment, it is assumed that an acknowledged response signal in step S23 is not transmitted.

In step S24, assuming that the user equipment cannot receive downlink data in a good condition, the downlink data being transmitted via a downlink data channel by using a new format. Here, the user equipment reports a negative acknowledged response signal (NACK) to the base station N times in a row.

The base station determines to change the transmission format from the new format back to the old format, in response to the fact that the negative acknowledged response signal is reported N times in a row.

In step S25, the base station notifies, to the user equipment, that the transmission format is to be changed.

In step S33, the base station changes the transmission format of the downlink data channel to the old format before the change. Then, the base station transmits the downlink data via the downlink data channel by using the old format, in a subsequent predetermined cyclic period.

In step S13, the user equipment receives the downlink data transmitted via the downlink data channel, by using the old format by the predetermined cyclic period.

According to the present embodiment, even when the transmission format is improperly changed in steps S31, S22, and S32, the base station can change the transmission format back to the original format based on a negative acknowledged response signal from the user equipment.

The user equipment may expect that the transmission format is to be changed back to the old format, when the negative acknowledged response signal is transmitted N times.

Third Embodiment

Figure 7:
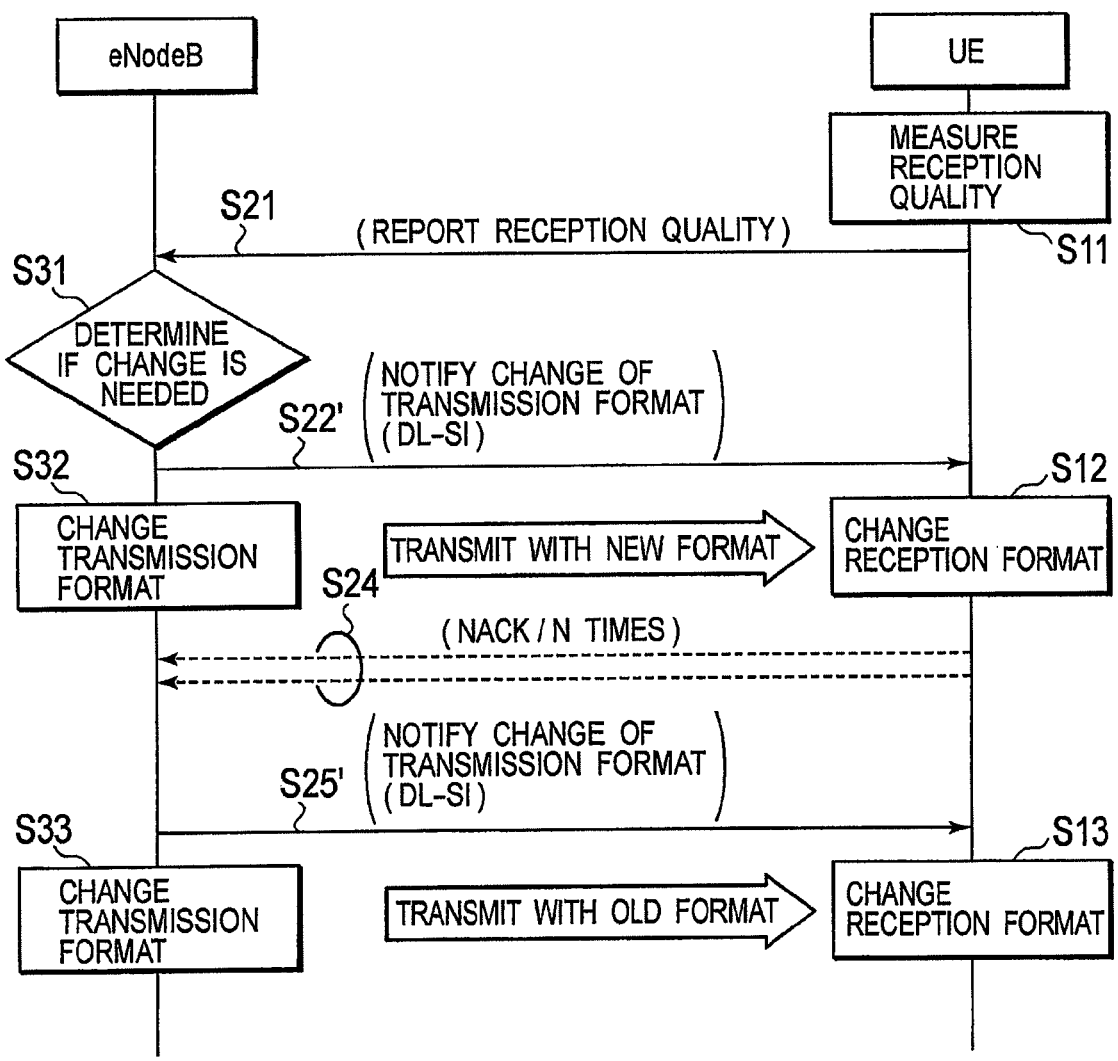
FIG. 7 is a flowchart showing an operational example of a mobile communication system according to a third embodiment of the present invention.

FIG. 7 is a flowchart showing an operational example of a mobile communication system according to the third embodiment of the present invention. An outline of such operation is similar to the operation described in FIG. 6, but a signal to be used for the change notification of the transmission format is different.

In the present embodiment, a base station is configured to transmit the change notification, by using a downlink control channel transmitted independently from a downlink data channel.

The downlink control channel transmits downlink scheduling information (DL-SI) by a predetermined cyclic period. The predetermined cyclic period is set to be longer than a transmission frequency (20 ms) of the downlink data channel, for example, 100 ms.

FIG. 8 shows a timing chart before and after the transmission format change.

As shown in FIG. 8, the downlink data is transmitted in a first cyclic period (20 ms) via the downlink data channel. In addition, a downlink control signal (the above-described change notification) is transmitted in a second cyclic period (100 ms) via the above-described downlink control channel (DL-SI).

Here, the second cyclic period may be the same as the "period" described in FIG. 4.

In the first period $T_1$, the transmission formation is not changed, and the first transmission format, which is the same as the transmission format used in the preceding period, is used.

In the second period $T_2$, the transmission format is changed to the second transmission format, and the information notifying the change of the transmission format (DL-SI) is transmitted at the beginning X of the second period $T_2$, via the downlink control channel.

Furthermore, in the third period $T_3$, the transmission format is changed back to the original first transmission format. The information notifying the change of the transmission format (DL-SI) is transmitted at the beginning Y of the third period $T_3$, via the downlink control channel.

In the present embodiment, in a case where the transmission format is changed, the information notifying the transmission format change is transmitted at the beginning of each period (more generally, at any given time point set in advance). Accordingly, the base station is not required to notify, to the user equipment, the change timing of the transmission format.

Note that, the entire content of Japanese Patent Application No. 2006-169441 (filed on Jun. 19, 2006) is incorporated herein by reference.

In addition, the entire content of "R1-051511, 7-11 Nov., 2005, 3GPP TSG-RAN WG1 #43, Qualcomm Europe, Page 2, Section 3" is incorporated herein by reference.

Also, the entire content of "R2-060550, 13-17 Feb., 2006, 3GPP TSG-RAN WG2 #51, Qualcomm Europe, Page 1, Section 2" is incorporated herein by reference.

As described above, the present invention has been described in detail by using the above-described embodiments. However, it is clear for those skilled in the art that the present invention is not limited to the embodiment described herein. The present invention can be implemented as modified and changed embodiments without departing from the purpose and scope of the invention which is defined by the description of the scope of claims. Accordingly, the description of the present specification is intended to provide exemplary description and does not have any meaning of limiting the present invention.

INDUSTRIAL APPLICABILITY

As described above, the embodiment of the present invention can provide a base station, a user equipment, and a method, in which a downlink data transmission efficiency can be improved in a mobile communication system configured to transmit downlink data to a user equipment by a predetermined cyclic period by using an existing transmission format.

The invention claimed is:

1. In a mobile communication system in which performing persistent scheduling which a downlink data to be periodically transmitted is transmitted via a downlink data channel by using a transmission format known to a user equipment, a base station performing a radio communication with the user equipment, comprising:
   a transmission format determining unit configured to change a transmission format known to the user equipment, based on a downlink reception signal quality measured by the user equipment;
   a notification unit configured to notify, to the user equipment, the transmission format changed by the transmission format determining unit; and
   a transmitting unit configured to transmit downlink data to the user equipment via the downlink data channel, by using the transmission format changed by the transmission format determining unit,
   wherein the transmitting unit is configured to transmit the downlink data via the downlink data channel, in a first cyclic period, and
   the notification unit is configured to notify, to the user equipment, the transmission format changed by the transmission format determining unit, by using the control channel, in a second cyclic period that is longer than the first cyclic period.

2. The base station according to claim 1, wherein the notification unit is configured to notify, to the user equipment, the transmission format changed by the transmission format determining unit, by using the downlink data channel.

3. The base station according to claim 1, wherein the notification unit is configured to notify, to the user equipment, the transmission format changed by the transmission format determining unit, by using a Radio Resource Control signaling message.

4. The base station according to claim 1, wherein the notification unit is configured to notify, to the user equipment, the transmission format changed by the transmission format determining unit, by using a Media Access Control protocol data unit.

5. The base station according to claim 1, wherein the notification unit is configured to notify, to the user equipment, information indicating a difference between a current transmission format of the downlink data channel and the transmission format changed by the transmission format determining unit, as the transmission format changed by the transmission format determining unit.

6. The base station according to claim 1, wherein the transmitter unit is configured to change the transmission format of the downlink data channel to the transmission format changed by the transmission format determining unit after an acknowledged response signal for the transmission format changed by the transmission format determining unit and notified to the user equipment is received from the user equipment.

7. The base station according to claim 1, wherein the transmitter unit is configured to change the transmission format of the downlink data channel back to the transmission format before a change, after a negative acknowledged response signal for the notified transmission format changed by the transmission format determining unit is received from the user equipment a predetermined number of times.

8. In a mobile communication system in which performing persistent scheduling which a downlink data to be periodically transmitted is transmitted via a downlink data channel by using a transmission format known to a user equipment, a method used in a base station performing a radio communication with the user equipment, comprising:
   changing a transmission format known to the user equipment, based on a downlink reception signal quality measured by the user equipment;
   notifying, to the user equipment, the transmission format changed by the transmission format determining unit; and
   transmitting downlink data to the user equipment via the downlink data channel, by using the transmission format changed by the transmission format determining unit,
   wherein in the transmitting step, the downlink data is transmitted via the downlink data channel, in a first cyclic period, and
   in notifying step, the user equipment is notified of the transmission format changed by the transmission format determining unit, by using the control channel, in a second cyclic period that is longer than the first cyclic period.

* * * * *